(12) United States Patent
Elgammal (10) Patent No.: US 10,944,102 B2
(45) Date of Patent: Mar. 9, 2021

(54) SOLUTION-BASED FORMATION OF A NANOSTRUCTURED, CARBON-COATED, INORGANIC COMPOSITE

(71) Applicant: Sylvatex, Inc., Sunnyvale, CA (US)

(72) Inventor: Ramez Elgammal, Knoxville, TN (US)

(73) Assignee: Sylvatex, Inc., Sunnyvale, CA (US)

( * ) Notice: Subject to any disclaimer, the term of this patent is extended or adjusted under 35 U.S.C. 154(b) by 0 days.

(21) Appl. No.: 15/722,817

(22) Filed: Oct. 2, 2017

(65) Prior Publication Data

US 2019/0312266 A1 Oct. 10, 2019

Related U.S. Application Data

(63) Continuation of application No. 15/441,136, filed on Feb. 23, 2017.

(60) Provisional application No. 62/298,962, filed on Feb. 23, 2016, provisional application No. 62/393,591, filed on Sep. 12, 2016.

(51) Int. Cl.
| | |
|---|---|
| *H01M 4/58* | (2010.01) |
| *H01M 10/0525* | (2010.01) |
| *H01M 4/525* | (2010.01) |
| *H01M 4/505* | (2010.01) |
| *H01M 4/36* | (2006.01) |
| *H01M 4/485* | (2010.01) |
| *H01M 4/62* | (2006.01) |

(52) U.S. Cl.
CPC .......... *H01M 4/366* (2013.01); *H01M 4/485* (2013.01); *H01M 4/505* (2013.01); *H01M 4/525* (2013.01); *H01M 4/5825* (2013.01); *H01M 4/625* (2013.01); *H01M 10/0525* (2013.01)

(58) Field of Classification Search
CPC .............. H01M 4/366; H01M 4/5825; H01M 10/0525; H01M 4/625; H01M 4/485; H01M 4/505; H01M 4/525
See application file for complete search history.

(56) References Cited

U.S. PATENT DOCUMENTS

| 2012/0164536 A1* | 6/2012 | Huang | H01M 4/485 |
| | | | 429/231.1 |
| 2014/0045058 A1* | 2/2014 | Zhao | H01M 4/134 |
| | | | 429/211 |
| 2015/0158728 A1* | 6/2015 | Liang | B82Y 30/00 |
| | | | 252/506 |

* cited by examiner

*Primary Examiner* — Muhammad S Siddiquee
(74) *Attorney, Agent, or Firm* — Jeff Duncan; Tony Pullen; Aligned IP, LLC (57) ABSTRACT

A process for solution-based formation of a nanostructured, carbon-coated, inorganic composite includes selecting a supply of inorganic material in a solution, selecting a supply of a carbon-containing solution, and synthesizing the composite by causing the inorganic material to react in the carbon-containing solution. The synthesized composite may be conductive-carbon-coated, and may be for electrochemical applications such as battery cathodes and anodes. The selecting step may involve varying relative amounts of polar fluid, microblender and water components to synthesize a crystalline inorganic composite. There may be a step of retaining and reusing the supply of carbon-containing solution that remains after the synthesizing, and testing the supply of carbon-containing solution that remains to determine whether it can be used again. There may be steps of controlling the composite particle size and morphology and forming desired particle size as a function of the chemical composition of the carbon-containing solution.

29 Claims, 6 Drawing Sheets

XRD of LiFePO$_4$/C composite

FIG. 5

SEM of a LiFePO$_4$/C composite

FIG. 6

Cycling study of LiFePO$_4$/C material assembled into a coin cell

FIG. 7

Cell voltage versus lithium as a function of capacity for various C-rates

FIG. 8

SOLUTION-BASED FORMATION OF A NANOSTRUCTURED, CARBON-COATED, INORGANIC COMPOSITE

CROSS-REFERENCES TO RELATED APPLICATIONS

This application is a continuation of U.S. patent application Ser. No. 15/441,136, filed Feb. 23, 2017 and entitled "Solution-Based Formation of a Nanostructured, Carbon-Coated, Inorganic Composite", which application claims the benefit under 35 U.S.C. § 119(e) of U.S. Provisional Patent Application Ser. No. 62/298,962, filed Feb. 23, 2016 and U.S. Provisional Patent Application Ser. No. 62/393,591, filed Sep. 12, 2016, each of which is hereby incorporated by reference in its entirety for all purposes.

TECHNICAL FIELD

The disclosure relates to the field of materials science and, more particularly, to solution-based methods of forming nanocomposites.

BACKGROUND

Lithium Ion Battery (LIB) composites are made using several conventional synthesizing methodologies, including: (i) solid-state reaction; (ii) carbothermal reduction; (iii) solution-based methods that employ hydrothermal/solvothermal, sol-gel, or co-precipitation; (iv) precipitation; and (v) emulsion drying. Each of the above methodologies has undesirable aspects that can be characterized generally as requiring relatively high cost raw materials, relatively high operating or reaction temperatures of >100° C., a relatively complex number of steps that includes a step of crushing, milling, grinding, mechanically mixing, or blending to produce the inorganic composite.

SUMMARY

The invention can be characterized as a process for solution-based formation of a nanostructured, carbon-coated, inorganic composite. That process includes selecting a supply of inorganic material in a solution, selecting a supply of a carbon-containing solution, and synthesizing the composite by causing the inorganic material to react in the carbon-containing solution.

The invention may also be characterized as the product made by the above process. The synthesized composite may be conductive-carbon-coated, and may be LFP or NMC for electrochemical applications such as cathodes. The selecting step may involve varying relative amounts of polar fluid, microblender and water components to synthesize a crystalline inorganic composite. There may be a step of retaining and reusing the supply of carbon-containing solution that remains after the synthesizing, and testing the supply of carbon-containing solution that remains to determine whether it can be used again. There may be steps of controlling the composite particle size and morphology and forming desired particle size as a function of the chemical composition of the carbon-containing solution.

DETAILED DESCRIPTION OF THE INVENTION

Figure 1:
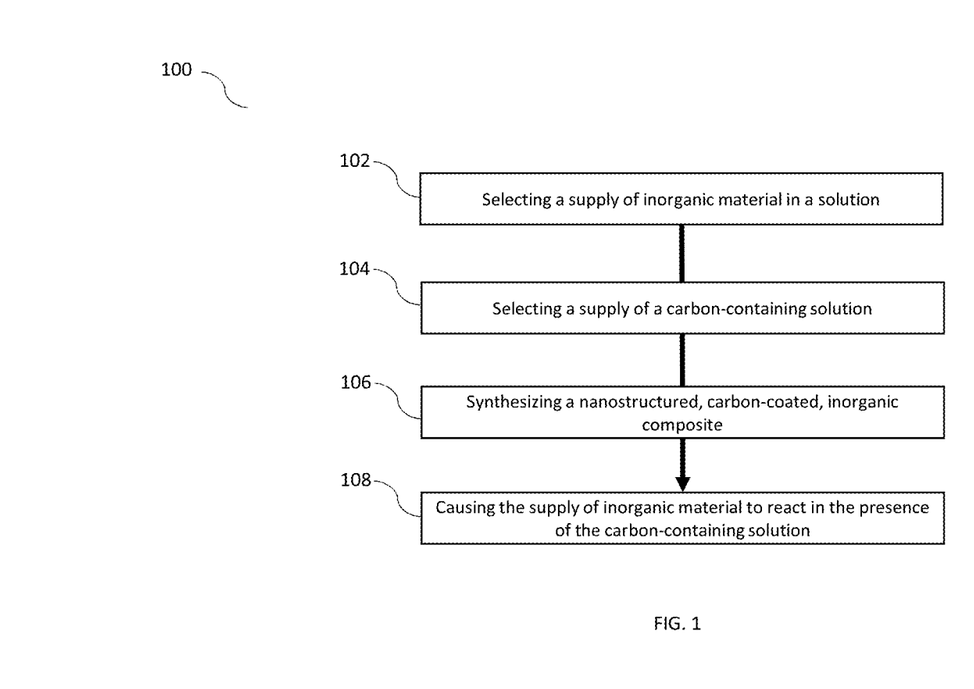
FIG. 1 is a schematic block diagram illustrating the process of the invention.

Referring to FIG. 1, an embodiment of the invention is shown at 100 and is a process for solution-based formation of a nanostructured, carbon-coated, inorganic composite. Process 100 includes at 102, selecting a supply of inorganic material in a solution, at 104, selecting a supply of a carbon-containing solution including renewable fatty acids and naturally derived alcohols and, at 106 synthesizing a nanostructured, carbon-coated, inorganic composite by, at 108, causing the supply of inorganic material to react in the presence of the carbon-containing solution.

Selecting step 102 may involve selecting a supply of the carbon-containing solution that includes a fatty acid. The selected carbon-containing solution may also include a polar fluid component, a microblender component and a water component, and each of those components are further described in co-pending U.S. patent application Ser. No. 14/318,365 ("the Co-Pending Application"), and will be described further below, after a discussion of FIGS. 1-3.

Still referring to FIG. 1, selecting step 104 may also involve varying the relative amounts of the polar fluid, microblender and water components so that synthesizing step 106 produces a crystalline inorganic composite. Synthesizing step 106 may also involve synthesizing a crystalline inorganic composite. After the synthesizing step is practiced, there remains an amount of the carbon-containing solution, which could be discarded using suitable methods. However, FIG. 2 shows an embodiment of the invention that provides an alternative to discarding the remaining amount of the carbon-containing solution.

Figure 2:
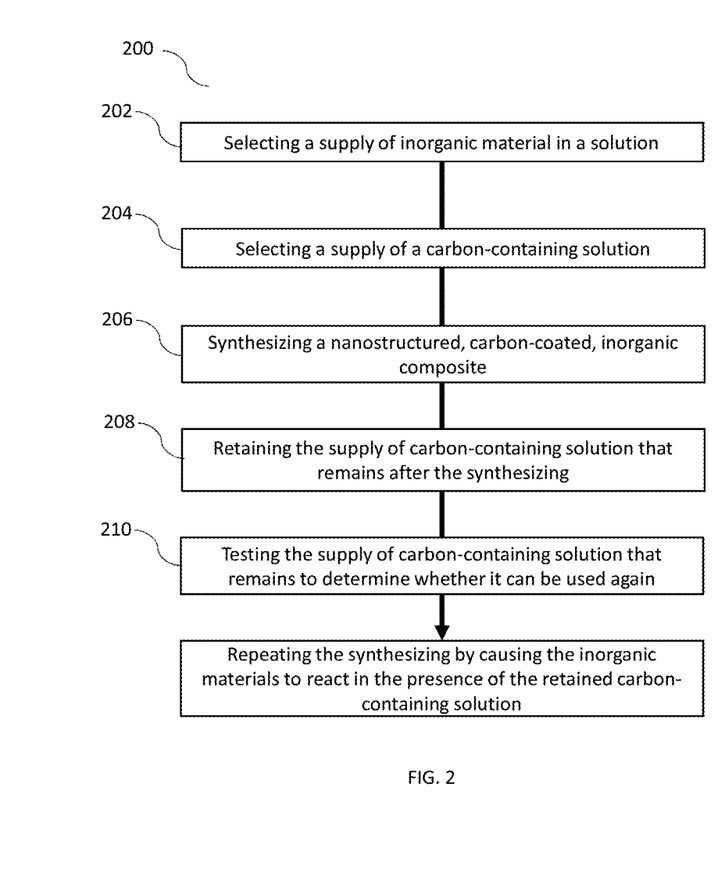
FIG. 2 is a schematic block diagram that illustrates another version of the process of the invention.
Figure 3:
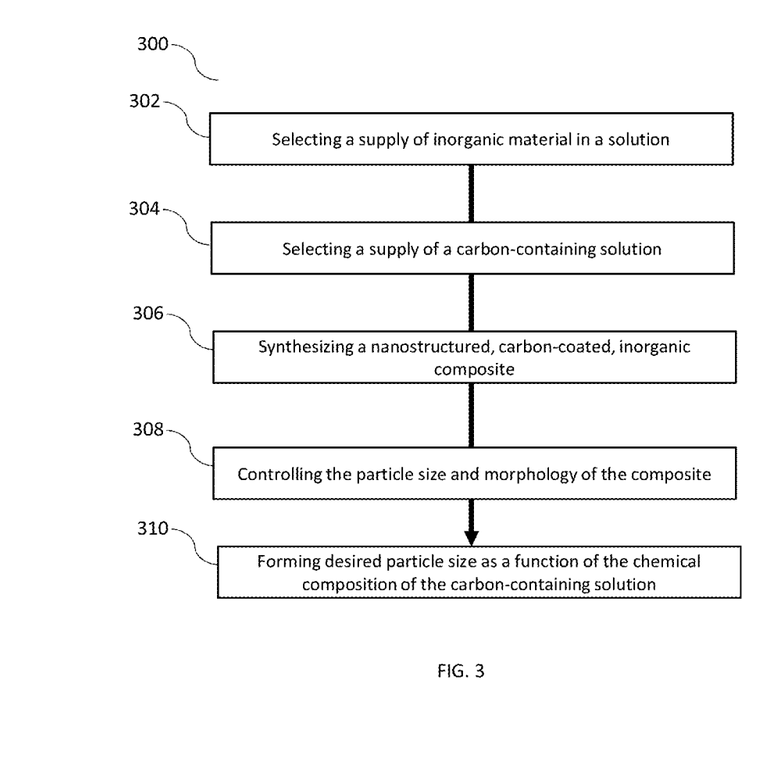
FIG. 3 is a schematic block diagram that illustrates another version of the process of the invention.

Referring to FIG. 2, another embodiment of the invention is shown at 200, and is also a process like process 100, including selecting steps 202 and 204, like selecting steps 102 and 104 of FIG. 1, and a synthesizing step 206, like synthesizing step 106 of FIG. 1. However, unlike process 100, process 200 also includes at 208, retaining the supply of carbon-containing solution that remains after the synthesizing. Retaining step 208 may also include at 210, testing the supply of carbon-containing solution that remains to determine whether it can be used again. Such testing could including any suitable, commercially available method, including, for example, GC, GCMS, and LC. Process 200 also includes at 212, repeating the synthesizing by causing the inorganic materials to react in the presence of the retained carbon-containing solution. Referring to FIG. 3, another embodiment of the invention is shown at 300, and is also a process like process 100, including selecting steps 302 and 304, like selecting steps 102 and 104 of FIG. 1. There is also a synthesizing step 306, like synthesizing step 106 of FIG. 1. However, synthesizing step 306 involves synthesizing a nanostructured, carbon-coated, crystalline inorganic composite.

Still referring to FIG. 3, synthesizing step 306 includes at 308, controlling the particle size and morphology of the composite. The controlling may involve, as at 310, forming desired particle size as a function of the chemical composition of the carbon-containing solution. Changes in the chemical composition of the carbon-containing solution produce changes in the particle size, morphology, and in some cases the composition of the synthesized composite.

Referring generally to FIGS. 1-3, the invention may also be characterized as a nanostructured, carbon-coated, inorganic composite formed by the above-described process. The process and the inorganic composite of the invention may have electrochemical applications, such as to synthesize a nanostructured, conductive-carbon-coated, inorganic composite that is suitable for electrochemical applications.

One of those applications could be for use as a cathode in a battery and, for that use, the process could be practiced to synthesize battery composites, such as battery-cathode or battery-anode composites. Battery-cathode composites may include Lithium Iron Phosphate (LFP)(LiFePO$_4$), Lithium Nickel Manganese Cobalt Oxide (NMC)(LiNiMnCoO$_2$), Lithium Cobalt Oxide (LCO)(LiCoO$_2$), Lithium Manganese Oxide (LMO)(LiMn$_2$O$_4$), and Lithium Nickel Cobalt Aluminum Oxide (NCAO)(LiNiCoAlO$_2$). Battery-anode composites could include Lithium Titanate (LTO)(Li$_4$Ti$_5$O$_{12}$).

For electrochemical applications, the selecting step 102, 202, 302 would involve selecting a supply of conductive-carbon-containing solution.

Referring generally to selecting steps 102, 202 and 302, the selected carbon-containing solution may, as noted above, also include a polar fluid component, a microblender component and a water component. A mixture of these three components is also referred to herein as a blendstock or microblend. As further described in the Co-Pending Application, the polar fluid component may include one or more polar fluids, such as alcohols like ethanol. For example, the polar fluid may include ethanol of a relatively low grade, and those low grades will also have a water component. Ethanols of a low grade have a water content of 5-20%, assuming water is the main contaminant.

The polar fluid component may involve selecting an alcohol from a group comprising (a) n-propyl alcohol, (b) iso-propyl alcohol, (c) n-butyl alcohol, a mixed alcohol formulation (e.g., ENVIROLENE®), methanol, and ethanol, and blending the alcohol and the water component to form the one or more polar fluids. Blending the alcohol and water may involve formulating the amount of water so that the amount of water comprises about 1-30% of the one or more polar fluids. Preferably, the amount of water comprises about 5-20% of the one or more polar fluids. Preferably, the alcohol component includes ethanol. ENVIROLENE® is a mixed alcohol formulation made by Standard Alcohol Company of America. Examples of suitable mixed alcohol formulations are described in U.S. Pat. No. 8,277,522 and published U.S. Patent Application No. 2013/0019519, which are hereby incorporated by reference.

The microblender component may be a fatty acid, such as one chosen from a group comprising saturated and/or unsaturated carboxylic acids and/or esters containing 14 to 24 carbons, such as oleic acid, elaidic acid, erucic acid, linoleic acid, lauric acid, myristic acid, and stearic acid. The microblender may also be a fatty acid chosen from a group comprising suitable unsaturated or saturated fatty acids.

A neutralizer may also be combined with the polar fluid, microblender and water components, and the neutralizer is chosen for its capability of neutralizing the microblender component. For example, the neutralizer may involve selecting a component of a lower pH than the microblender component. For example, if the microblender component includes an acidic component, then selecting the neutralizer may involve selecting a basic component. Preferably, the neutralizer includes an ammonia component, such as ammonium hydroxide.

EXAMPLE

An application of the process of the invention was made by synthesizing LiFePO$_4$/C lithium ion battery cathode materials in recyclable, reverse-micelle media. The process allows for control of particle size and morphology, lower reaction temperature, improves electrochemical performance, provides a carbon coating for improved electrical conductivity, and provides for a recyclable reaction medium.

Figure 4:
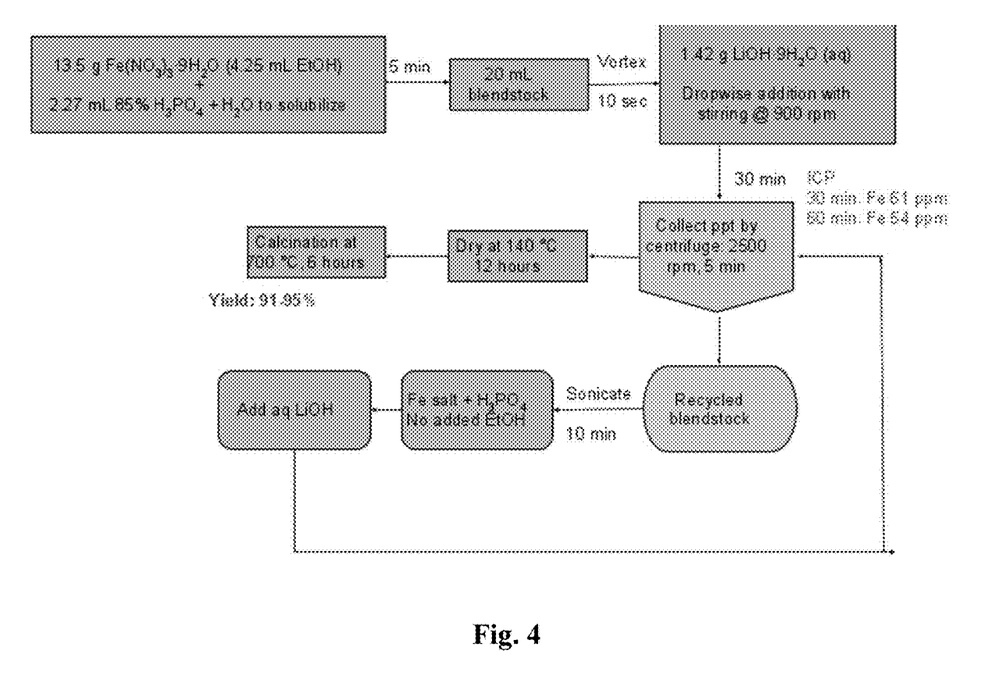
FIG. 4 is a schematic diagram showing use of recycled blendstock.

The use of recycled blendstock is shown in FIG. 4.
General Procedure of Solution-Based Nanostructured Material Formation An iron salt (may be Fe(II) or Fe(III); in this example FeCl$_2$.4H$_2$O was used) was dissolved in ethanol or ethanol/water mixtures at ~0.5 mmol/mL The salt concentration affects the crystalline structure of the synthesized inorganic composite. To that solution, ~2+ by volume of blendstock was added and the mixture was heated at 60° C. for 1 hour. Separate solutions were prepared containing: (i) 85% H$_3$PO$_4$ (ammonium dihydrogen phosphate may also be used) at 1 mmol/mL in ethanol; and (ii) a lithium salt (e.g., lithium acetate, lithium acetylacetonate, lithium iodide, lithium chloride, lithium hydroxide) at 1 mmol/mL in ethanol or ethanol/water mixtures. The solutions were simultaneously added dropwise to the mixture containing the iron salt and blendstock with constant stirring, then heated to 120° C. for 2 hours, and then transferred to a Teflon® flask and heated to 250° C. for 4 hours. The flask was allowed to cool to room temperature, the resulting cake was washed with water, and allowed to dry in an oven at 120° C. for 8 hours.

Figure 5:
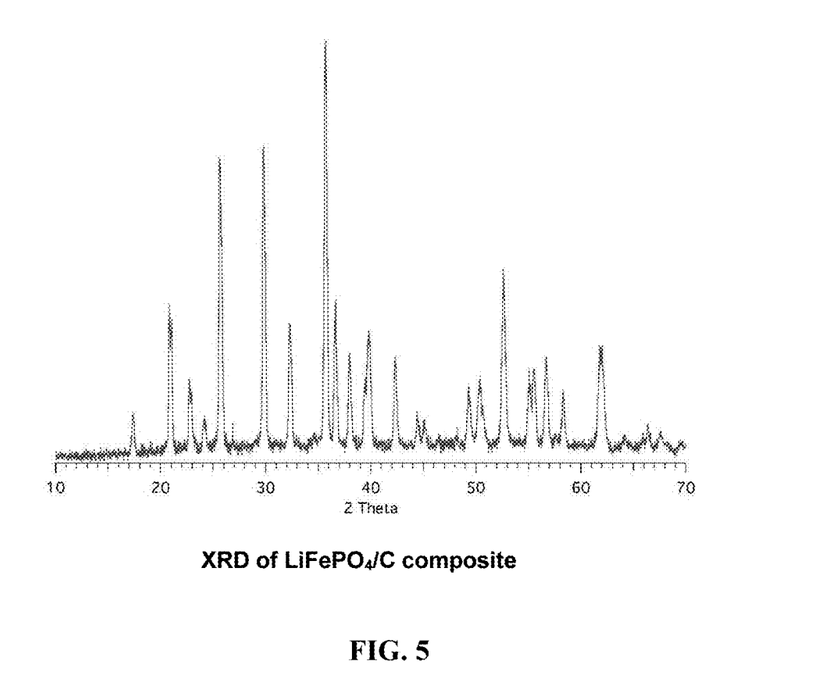
FIG. 5 shows the $LiFePO_4/C$ composite characterized using XRD and electrochemical performance.
Figure 6:
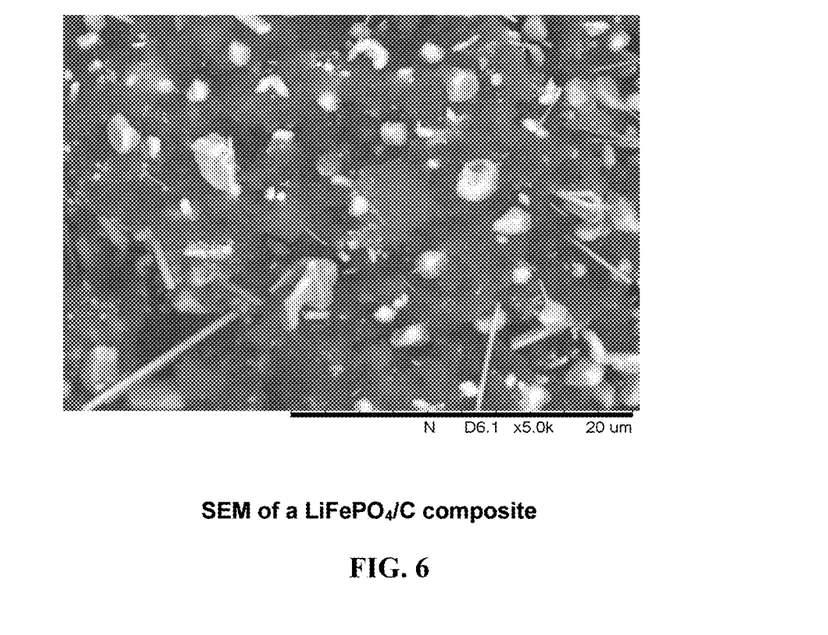
FIG. 6 shows the $LiFePO_4/C$ composite characterized using SEM and electrochemical performance.
Figure 7:
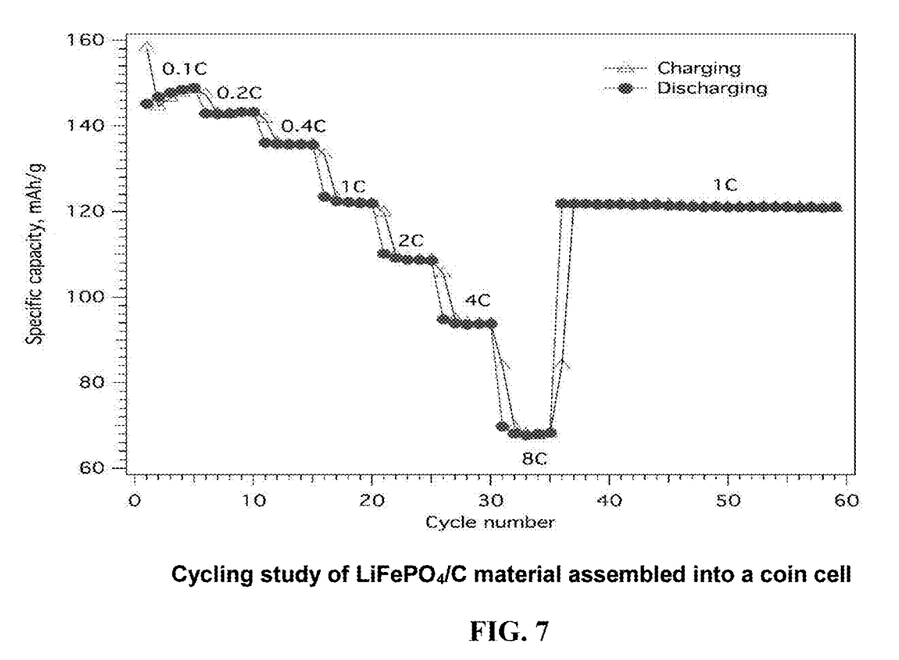
FIG. 7 is a schematic diagram showing the cycling study of $LiFePO_4/C$ material assembled into a coin cell.
Figure 8:
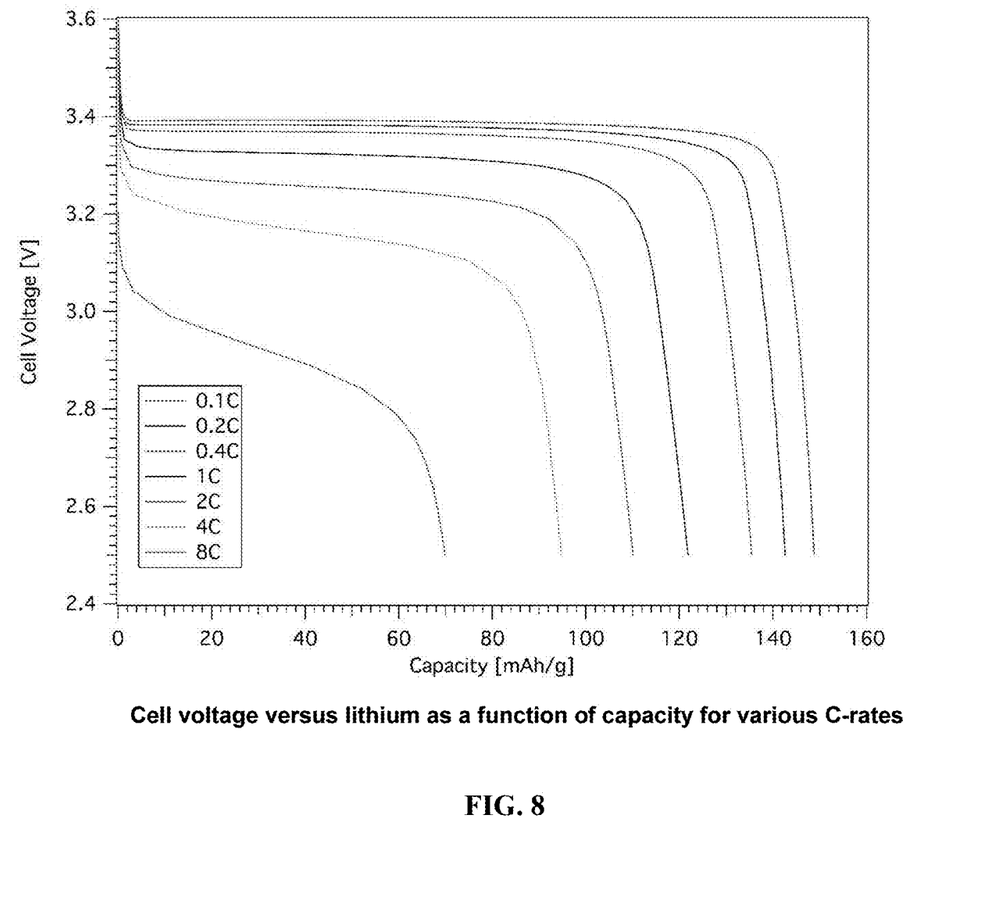
FIG. 8 is a schematic diagram showing cell voltage versus lithium as a function of capacity for various C-rates.

The resulting solid was ground into a powder and placed in an alumina crucible and heated to 700° C. under Ar/H$_2$ for 4 hours to give LiFePO$_4$/C. The LiFePO$_4$/C composite was characterized using XRD, SEM, and electrochemical performance, and the results of those tests are shown in FIGS. 5 and 6.
Electrochemical Performance The LiFePO$_4$/C composite was vacuum dried overnight at 100° C. and tape cast with binder and conductive additive and assembled into a coin cell with a lithium counter electrode. The cell was full charged and then discharged to 2.5 V versus Li at various C-rates. FIGS. 7-8 show respectively, a schematic diagram of the cycling study of LiFePO$_4$/C material assembled into a coin cell, and a schematic diagram of cell voltage versus lithium as a function of capacity for various C-rates.

The invention may also be described in the following number paragraphs.

1. A process for solution-based formation of a nanostructured, conductive-carbon-coated, inorganic, composite, cathode material, comprising:

selecting a supply of inorganic material in a solution;

selecting a supply of a conductive-carbon-containing solution; and synthesizing a nanostructured, conductive-carbon-coated, inorganic, composite cathode material by causing the supply of inorganic material to react in the presence of the conductive-carbon-containing solution.

2. The process of paragraph 1, wherein the selecting step involves selecting a supply of the carbon-containing solution that includes a fatty acid.

3. The process of paragraph 2, wherein the selecting step involves selecting a supply of a carbon-containing solution that includes a polar fluid component, a microblender component and a water component.

4. The process of paragraph 2, wherein the synthesizing step involves synthesizing a crystalline inorganic composite.

5. The process of paragraph 4, wherein the selecting step also involves varying the relative amounts of the polar fluid, microblender and water components so that the synthesizing step produces a crystalline inorganic composite.

6. The process of paragraph 5, further including the step of retaining the supply of carbon-containing solution that remains after the synthesizing.

7. The process of paragraph 6, wherein the retaining step includes testing the supply of carbon-containing solution that remains to determine whether it can be used again.

8. The process of paragraph 7, further including the step of repeating the synthesizing by causing the inorganic materials to react in the presence of the retained carbon-containing solution.

9. The process of paragraph 1, wherein the synthesizing step includes controlling the particle size and morphology of the composite.

10. The process of paragraph 9, wherein the controlling involves forming desired particle size as a function of the chemical composition of the carbon-containing solution.

11. The process of paragraph 1, wherein the selecting step involves selecting a supply of conductive-carbon-containing solution.

12. The process of paragraph 11, wherein the synthesized composite is chosen from the group consisting of LFP, NMC, LCO, LMO, and NCA.

13. A nanostructured, conductive-carbon-coated, inorganic, composite cathode material formed from a solution-based reaction, comprising:
    selecting a supply of inorganic material in a solution;
    selecting a supply of a conductive-carbon-containing solution; and
    synthesizing a nanostructured, conductive-carbon-coated, inorganic, composite cathode material by causing the supply of inorganic material to react in the presence of the conductive-carbon-containing solution.

14. The composite cathode material of paragraph 13, wherein the selecting step involves selecting a supply of the carbon-containing solution that includes a fatty acid.

15. The composite cathode material of paragraph 14, wherein the selecting step involves selecting a supply of a carbon-containing solution that includes a polar fluid component, a microblender component and a water component.

16. The composite cathode material of paragraph 14, wherein the synthesizing step involves synthesizing a crystalline, inorganic, composite, cathode material.

17. The composite cathode material of paragraph 16, wherein the selecting step also involves varying the relative amounts of the polar fluid, microblender and water components so that the synthesizing step produces a crystalline, inorganic, composite, cathode material.

18. The composite cathode material of paragraph 17, further including the step of retaining the supply of carbon-containing solution that remains after the synthesizing.

19. The composite cathode material of paragraph 18, wherein the retaining step includes testing the supply of carbon-containing solution that remains to determine whether it can be used again.

20. The composite cathode material of paragraph 19, further including the step of repeating the synthesizing by causing the inorganic materials to react in the presence of the retained carbon-containing solution.

21. The composite cathode material of paragraph 13, wherein the synthesizing step includes controlling the particle size and morphology of the composite cathode material.

22. The composite cathode material of paragraph 21, wherein the controlling involves forming desired particle size as a function of the chemical composition of the carbon-containing solution.

23. The composite cathode material of paragraph 13, wherein the selecting step involves selecting a supply of conductive-carbon-containing solution.

24. The composite cathode material of paragraph 23, wherein the synthesized composite cathode material is chosen from the group consisting of LFP and NMC.

25. A nanostructured, carbon-coated, inorganic composite formed from a solution-based reaction, comprising:
    selecting a supply of inorganic materials in an aqueous solution;
    selecting a supply of a carbon-containing solution; and
    synthesizing a nanostructured, carbon-coated, inorganic composite by causing the supply of inorganic materials to react in the presence of the carbon-containing solution.

26. The composite of paragraph 25, wherein the selecting step involves selecting a supply of the carbon-containing solution that includes a fatty acid.

27. The composite of paragraph 26, wherein the selecting step involves selecting a supply of a carbon-containing solution that includes a polar fluid component, a microblender component and a water component.

28. The composite of paragraph 26, wherein the synthesizing step involves synthesizing a crystalline inorganic composite.

29. The composite of paragraph 28, wherein the selecting step also involves varying the relative amounts of the polar fluid, microblender and water components so that the synthesizing step produces a crystalline inorganic composite.

30. The composite of paragraph 29, further including the step of retaining the supply of carbon-containing solution that remains after the synthesizing.

31. The composite of paragraph 30, wherein the retaining step includes testing the supply of carbon-containing solution that remains to determine whether it can be used again.

32. The composite of paragraph 31, further including the step of repeating the synthesizing by causing the inorganic materials to react in the presence of the retained carbon-containing solution.

33. The composite of paragraph 25, wherein the synthesizing step includes controlling the particle size and morphology of the composite.

34. The composite of paragraph 33, wherein the controlling involves forming desired particle size as a function of the chemical composition of the carbon-containing solution.

35. The composite of paragraph 34, wherein the selecting step involves selecting a supply of conductive-carbon-containing solution.

36. The composite of paragraph 35, wherein the synthesizing produces a nanostructured, conductive-carbon-coated, inorganic composite that is suitable for electrochemical applications.

37. The composite of paragraph 36, wherein the synthesized composite is suitable for use in the group consisting of a battery cathode and battery anode.

38. The composite of paragraph 37, wherein the synthesized composite is chosen from the group consisting of LFP, NMC, LMO, LCO, NCAO, and LTO.

In the preceding description, various aspects of claimed subject matter have been described. For purposes of explanation, specific numbers, systems and/or configurations were set forth to provide a thorough understanding of the claimed subject matter. However, it should be apparent to one skilled in the art having the benefit of this disclosure that claimed subject matter may be practiced without the specific details. In other instances, features that would be understood by one of ordinary skill were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

I claim:

1. A method of forming a nanostructured, carbon-coated LiFePO4, the method comprising:
    dissolving a Fe(II) or Fe(III) containing salt to form an iron salt solution;
    adding a blendstock solution to the iron salt solution to form a first mixture, wherein the blendstock solution comprises water, an alcohol, and a fatty acid;
    adding an aqueous solution having a $PO_4^{3-}$ ion and an alcoholic lithium salt solution simultaneously to the iron salt/blendstock mixture to form a second mixture;
    heating and stirring the second mixture to facilitate formation of particles of $LiFePO_4$;
    cooling the reacted second mixture to form a cake;
    washing the cake;
    drying the washed cake to form a solid; and
    calcining the solid to form the nanostructured carbon-coated $LiFePO_4$.

2. The method of claim 1, further comprising recycling the blendstock solution collected after forming the cake wherein the collected blendstock solution is added to a freshly prepared iron salt solution, and repeating the steps in claim 1 to form a new batch of nanostructured, carbon-coated, $LiFePO_4$.

3. The method of claim 1, wherein the Fe(II) or Fe(III) salt comprises $Fe(NO_3)_3 \cdot 9H_2O$ or $FeCl_2 \cdot 4H_2O$.

4. The method of claim 1, wherein the solvent in the iron salt solution is an alcohol.

5. The method of claim 4, wherein the alcohol is selected from the group consisting of n-propyl alcohol, iso-propyl alcohol, n-butyl alcohol, methanol, and ethanol.

6. The method of claim 1, wherein the amount of water comprises about 1-30% of the alcohol.

7. The method of claim 1, wherein the amount of water comprises about 5-20% of the alcohol.

8. The method of claim 1, wherein the fatty acid comprises 14 to 24 carbons.

9. The method of claim 1, wherein the fatty acid is selected from the group consisting of oleic acid, elaidic acid, erucic acid, linoleic acid, lauric acid, myristic acid, and stearic acid.

10. The method of claim 1, wherein about twice the volume of blendstock is added compared to the volume of the iron salt solution.

11. The method of claim 1, further comprising adding a neutralizer to neutralize the pH.

12. The method of claim 11, wherein the neutralizer comprises an ammonia component.

13. The method of claim 12, wherein the ammonia component is ammonium hydroxide.

14. The method of claim 1, wherein the $PO_4^{3-}$ ion is derived from $H_3PO_4$ or $(NH_4)H_2PO_4$.

15. The method of claim 1, wherein drying the cake occurs at a temperature of about 120° C.

16. The method of claim 1, wherein calcining occurs at a temperature of about 700° C.

17. The method of claim 1, wherein calcining occurs in a hydrogen-containing atmosphere.

18. The method of claim 1, wherein the Fe(II) or Fe(III) salt solution is at a concentration of about 0.5 mmol/ml.

19. The method of claim 1, wherein the source of lithium in the lithium salt solution is selected from the group consisting of lithium acetate, lithium acetylacetonate, lithium iodide, lithium chloride, and lithium hydroxide.

20. The method of claim 1, further comprising grinding the solid to break down the solid before calcining the solid.

21. The method of claim 1, wherein heating the second solution comprises heating at 120° C. for about two hours and heating at 250° C. for about four hours.

22. The method of claim 1, further comprising grinding the solid to break down the solid.

23. A method to form carbon coated $LiFePO_4$, the method comprising:
    dissolving $Fe(NO_3)_3 \cdot 9H_2O$ to form an iron salt solution;
    adding the iron salt solution to an aqueous solution comprising $H_3PO_4$;
    adding a blendstock solution to form a mixture, wherein the blendstock solution comprises water, an alcohol, a fatty acid, and ammonium hydroxide;
    adding an aqueous solution of $LiOH \cdot 9H_2O$ to the mixture in a dropwise manner with stirring;
    collecting a precipitate by centrifugation;
    drying the precipitate; and
    calcining the dried precipitate to form the carbon coated $LiFePO_4$.

24. The method of claim 23, wherein the solvent in the iron salt solution is alcohol.

25. The method of claim 24, wherein the alcohol is ethanol.

26. The method of claim 23, wherein drying the precipitate occurs at a temperature of about 140° C.

27. The method of claim 23, wherein the centrifugation rate is about 2500 rpm.

28. The method of claim 23, wherein the mixture is stirred at about 900 rpm while the aqueous solution of $LiOH \cdot 9H_2O$ is added to the mixture in a dropwise manner.

29. The method of claim 23, further comprising recycling the blendstock solution collected after centrifugation, adding it to a freshly prepared iron salt solution, and repeating the steps in claim 23 with the recycled blendstock solution to form carbon coated $LiFePO_4$.

* * * * *